(12) United States Patent
Panchalingam et al.

(10) Patent No.: US 11,277,447 B2
(45) Date of Patent: Mar. 15, 2022

(54) DISTRIBUTED POLICY ENFORCEMENT PROXY WITH DYNAMIC EPG SHARDING

(71) Applicant: Cisco Technology, Inc., San Jose, CA (US)

(72) Inventors: Murukanandam Kamalam Panchalingam, Dublin, CA (US); Umamaheswararao Karyampudi, Fremont, CA (US); Junyun Li, San Jose, CA (US); Muralidhar Annabatula, Dublin, CA (US); Ronak K. Desai, Fremont, CA (US); Thomas J. Edsall, Los Gatos, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 16/931,610

(22) Filed: Jul. 17, 2020

(65) Prior Publication Data

US 2022/0021707 A1 Jan. 20, 2022

(51) Int. Cl.
| H04L 29/06 | (2006.01) |
| H04L 41/0806 | (2022.01) |
| H04L 41/0893 | (2022.01) |
| H04L 67/56 | (2022.01) |
| H04L 47/125 | (2022.01) |
| H04L 47/20 | (2022.01) |

(52) U.S. Cl.
CPC ......... *H04L 63/20* (2013.01); *H04L 41/0806* (2013.01); *H04L 41/0893* (2013.01); *H04L 47/125* (2013.01); *H04L 47/20* (2013.01); *H04L 63/0281* (2013.01); *H04L 67/28* (2013.01)

(58) Field of Classification Search
CPC ............ H04L 41/0806; H04L 41/0893; H04L 63/0281; H04L 63/20; H04L 67/28
See application file for complete search history.

(56) References Cited

U.S. PATENT DOCUMENTS

| 8,145,784 | B2 | 3/2012 | See et al. |
| 9,667,551 | B2 | 5/2017 | Edsall et al. |
| 9,899,088 | B1* | 2/2018 | Jiang ................ G06F 3/0625 |
| 10,277,500 | B2 | 4/2019 | Medved et al. |
| 10,320,687 | B2 | 6/2019 | Mekkattuparamban et al. |
| 2015/0124809 | A1* | 5/2015 | Edsall ............... H04L 41/0893 370/390 |
| 2020/0014636 | A1 | 1/2020 | Vallepalli et al. |

* cited by examiner

*Primary Examiner* — Gil H. Lee
(74) *Attorney, Agent, or Firm* — Edell, Shapiro & Finnan, LLC

(57) ABSTRACT

A distributed policy proxy system offloads network policy processing from an overloaded network element to policy proxy network elements. A network controller detects that policy resources are overloaded at a network element, and selects a group of policy proxy network elements. The network controller assigns an exclusive range of endpoint groups to each policy proxy network element. Each policy proxy network element is assigned to handle policy processing for its assigned range of endpoint groups. The network controller provides instructions to the policy proxy network elements to enable each policy proxy network element to apply the network policy for its assigned range of endpoint groups. The network controller also provides instructions to the overloaded network element to redirect a packet from the first endpoint group to a first policy proxy network element based on a destination of the packet.

20 Claims, 6 Drawing Sheets

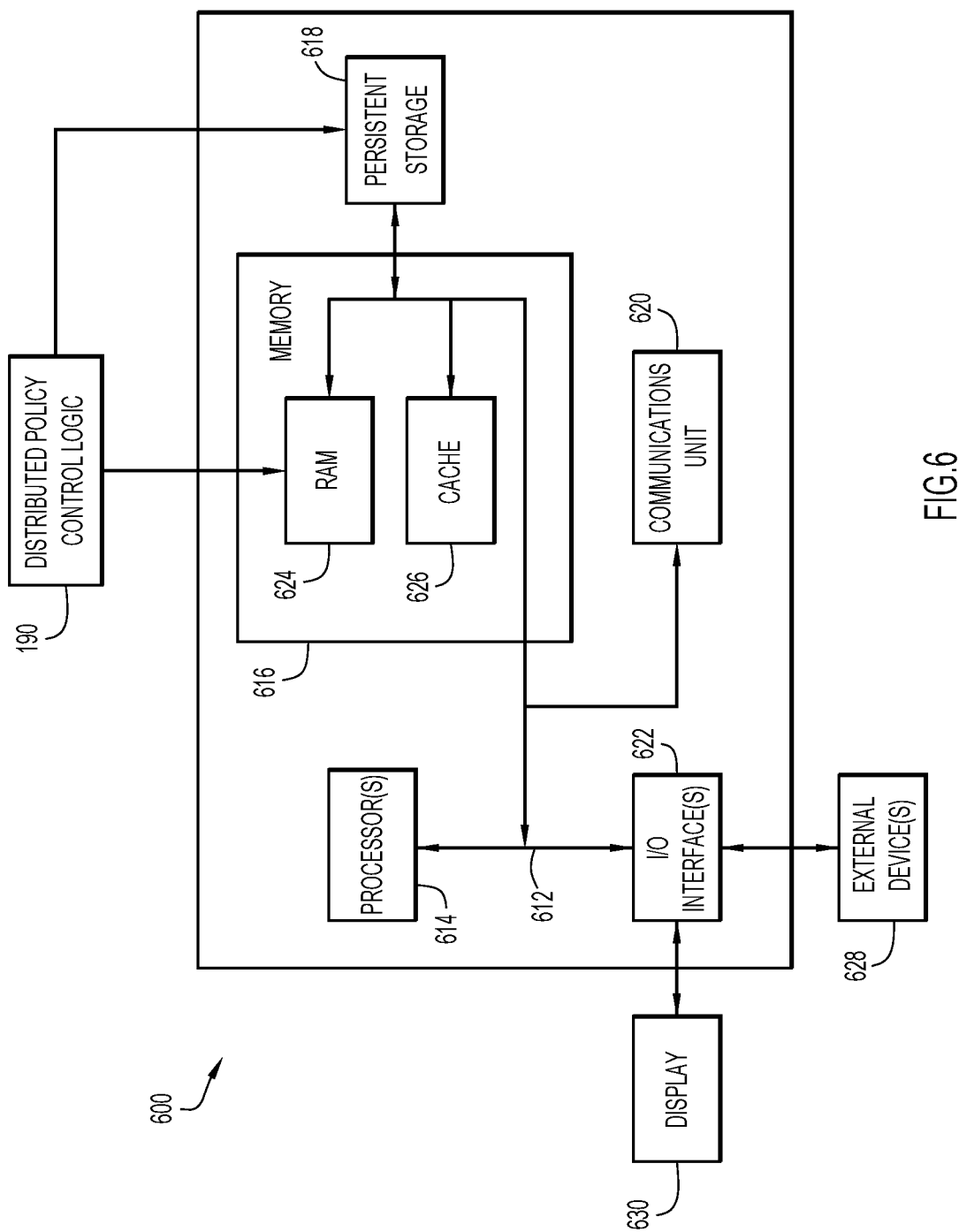

DISTRIBUTED POLICY ENFORCEMENT PROXY WITH DYNAMIC EPG SHARDING

TECHNICAL FIELD

The present disclosure relates to policy enforcement in network environments, especially through micro-segmentation.

BACKGROUND

Micro-segmentation based on Application or Virtual Machine (VM) workloads enables modern data centers to secure East-West communication with granular white-list/allow-list policies. The micro-segmentation may be applied in the network elements, or in a hypervisor for virtualized workloads, or in the hosts using agents. Amongst these three options, providing micro-segmentation in the network allows the operators to cover multiple possible workload environments, such as physical servers, different hypervisor environments, and/or Mainframe/Internet of Things (IoT) workloads. Additionally, network-based micro-segmentation is not impacted by host/hypervisor vulnerabilities.

However, network-based micro-segmentation with highly granular white-listing security policies may strain the limit of physical resources, such as Ternary Content Addressable Memory (TCAM) elements, that are available at network devices. Once the physical resource limits are reached, network operators may be limited to coarser policies that fit in the finite resources, or offload additional security policies to an external firewall or in-network dedicated policy proxy with more policy resources (e.g., a larger TCAM).

BRIEF DESCRIPTION OF THE DRAWINGS

FIG. 6 illustrates a simplified block diagram of a device that may be configured to perform the methods presented herein, according to an example embodiment.

DESCRIPTION OF EXAMPLE EMBODIMENTS

Overview

A computer implemented method is provided to offload network policy processing from an overloaded first network element to a plurality of policy proxy network elements. The method includes configuring a first network element among a plurality of network elements to apply a network policy for traffic associated with a first endpoint group. The first network element is connected to one or more first endpoints in the first endpoint group. The method also includes detecting that policy entries associated with the first endpoint group are overloading policy resources at the first network element. The method further includes selecting a plurality of policy proxy network elements and assigning a range of endpoint groups to each policy proxy network elements. Each policy proxy network element is assigned to handle policy processing for traffic with destination endpoints belonging to its assigned range of endpoint groups. The range of endpoint groups assigned to each particular policy proxy network element is exclusive to that particular policy proxy network element. The method also includes providing instructions to the plurality of policy proxy network elements to enable each policy proxy network element to apply the network policy for an assigned range of endpoint groups. The method further includes providing instructions to the first network element to redirect a packet from the one or more first endpoints in the first endpoint group to a first policy proxy network element among the plurality of policy proxy network elements based on a destination of the packet.

Example Embodiments

A group-based policy model may define an endpoint group (EPG) as a collection of endpoints (e.g., VMs or physical devices) that are bound by common policies, such as security policies. Typically, communication between endpoints within an EPG is trusted and allowed by default, but traffic between endpoints in different EPGs may be subject to policy enforcement. With regards to network security policy, each EPG may be considered a "Security Enforcement Domain."

In some examples, every EPG is identified with a "Group Tag" or "Class Identifier" that are used to define policy entries. Policy rules between EPGs may be defined by determining a source tag/class, a destination tag/class, and Layer 3/4 filters, and specifying an action (e.g., permit, deny, apply Quality of Service (QoS), or redirect) for each combination of source tag/class, destination tag/class, and filter.

When a packet arrives at a network device enforcing the EPG policies, the source tag/class and destination tag/class may be derived from the source/destination Internet Protocol (IP)/Media Access Control (MAC) addresses. The derived EPG group tag/class identifiers may be used to look up the appropriate policy action for the packet.

Figure 1:
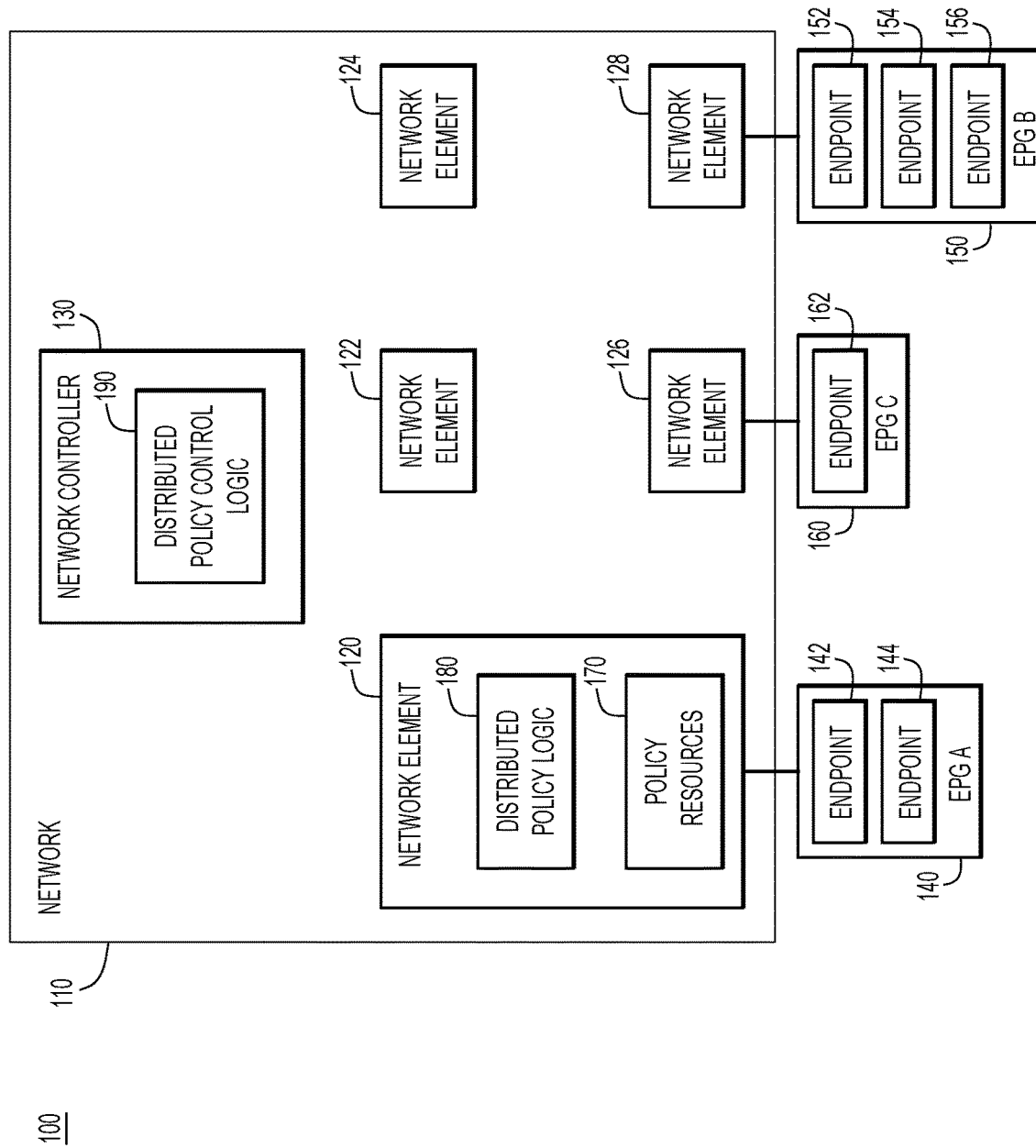
FIG. 1 is a simplified block diagram of a system for applying distributed policy proxies, according to an example embodiment.

Referring now to FIG. 1, a distributed policy proxy system 100 configured to implement policy decisions across a network 110. The network 110 includes network elements 120, 122, 124, 126, and 128, which are configured to implement policy decisions by a network controller 130. In one example, the network 110 may be configured in a spine-leaf configuration (i.e., a Clos network), with each of the network elements 120, 122, 124, 126, and 128 being leaf nodes in the network 110. The network element 120 is connected to endpoints 142 and 144 in an endpoint group 140 (also referred to herein as EPG A). The network element 128 is connected to endpoints 152, 154, and 156 in an endpoint group 150 (also referred to herein as EPG B). The network element 126 is connected to endpoint 162 in an endpoint group 160 (also referred to herein as EPG C).

The network element 120 includes policy resources 170 that stores policy entries related to the endpoint groups (e.g., endpoint group 140) connected to the network element 120. In one example, the policy resources may include a TCAM element configured with policy rules for network traffic originating from endpoints belonging to endpoint group 140. The network element 120 also includes distributed policy logic 180 that enables the network controller 130 to reconfigure the policy for endpoint group 140 across other network elements (e.g., network elements 122, 124, and 126).

The network elements 122, 124, 126, and 128 also include policy resources similar to policy resources 170 and logic similar to distributed policy logic 180. The network controller 130 includes distributed policy control logic 190 that enables the network controller 130 to configure the network elements 120, 122, 124, 126, and 128 to apply policy decisions according to the techniques described herein.

In one example, the network elements 120, 122, 124, 126, and 128 may be connected to endpoints from any of the endpoint groups 140, 150, and/or 160, as well as additional endpoint groups that are not specifically pictured in FIG. 1. For instance, the network element 120 may be connected to endpoints in endpoint group 160, as well as the endpoints 142 and 144 in endpoint group 140.

In another example, the endpoints 142, 144, 152, 154, 156, and 162 may be physical computing devices (e.g., laptop computers, desktop computers, tablets, servers, IoT devices, etc.) or virtual computing devices (e.g., virtual machines, containers, etc.). Each endpoint may be placed into a specific endpoint group based on multiple factors, including the user of the endpoint, the owner of the endpoint, the location of the endpoint, and/or other factors in the configuration of the endpoint.

In a further example, when endpoint 142 sends a message to endpoint 152, the network element 120 connected to the endpoint 142 may create a tunnel to the network element 128 connected to endpoint 152. As long as the policy resources 170 on the network element 120 (and the similar policy resources on network element 128) are not overloaded, any policy for traffic between endpoint group 140 and endpoint group 150 will be programmed into the policy resources of the network element 120 as the tunnel ingress node and network element 128 as the tunnel egress node.

The network element 120 may derive that traffic originating from endpoint 142 belongs to the endpoint group 140 since the endpoint 142 is local to the network element 120. However, if the destination endpoint (e.g., endpoint 152) is not local to the network element 120, then the network element 120 may not be able to derive the destination endpoint group 150 to apply the relevant policies. In this example, the network element 120 transmits the traffic to the destination (egress) network element 128 to apply egress policy enforcement. However, to prevent the network element 128 from having to re-derive the source endpoint group 140 of the traffic, the network element 120 may include an indication of the endpoint group 140 in an overlay header of the network 110. For instance, the network element 120 may include a source tag along with tenant identifier or Virtual Routing and Forwarding (VRF) identifier, such as the Virtual Network Identifier (VNID). In this example, the network element 128 reads the source endpoint group 140 from the overlay header, and derives the destination endpoint group 150 from the forwarding lookup of the local destination endpoint 152. With the source endpoint group 140 and the destination endpoint group 150 identified, the network element 128 may apply the appropriate policy to the traffic.

In one example, the policy resources 170 of the network element 120 may become overloaded, e.g., policy entries for highly granular policy entries are close to filling the policy TCAM. Even if the network controller 130 only configures the policy resources 170 with policy entries for endpoint groups of local endpoints (e.g., endpoints 142 and 144), the policy resources may still become overloaded. For instance, if the network element 120 hosts endpoints from multiple endpoint groups, the policy resources 170 of the network element 120 may store policy entries for each endpoint group communicating with every other endpoint group.

Network administrators may mitigate the use of policy resources at each network element by making the policy entries coarser, which may degrade the security of the network 110. Alternatively, the network administrator may limit the number of endpoint groups at each network element at the expense of flexibility and usability of the network 110 for the users of the network 110. The network administrators may also offload additional policy rules to a dedicated external firewall, which may require significant reconfiguring of the security policy in the network elements and the external firewall.

The techniques presented herein resolve the issue of overloading the policy resources in the network elements by distributing the policy rules across policy proxy network elements in the existing network elements to ensure a high utilization of the hardware resources across the network. The distributed policy proxy system 100 uses the local network element policy resources as much as possible to limit the traffic sent to policy proxy network elements. The network controller 130 picks a network element to be a policy proxy network element for an endpoint group for all packets destined for this endpoint group. The functionality of policy proxy network element is transparent to the end users, leaving the policy effect on the packet the same as if the policy is locally applied. The distributed policy proxy system 100 avoids any new hardware or separate hardware support, enabling policy to be consistent across all of the devices.

In one example, the network elements 120, 122, 124, 126, and 128 report the status of their respective policy resources to the network controller 130. For instance, the network elements may send periodic notifications with the policy TCAM capacity and utilization. The network controller 130 may address an overloaded policy TCAM in the network element 120 by heuristically determining to offload policies for endpoint group 140 to one or more other network elements (e.g., network element 122, 124, and 126), based on the other network elements having lower TCAM utilization.

If the TCAM capacity of a particular network element (e.g., network element 120) crosses a predetermined threshold, the network controller 130 may select one or more EPG policies to offload. For each selected EPG, the network controller 130 may offload some or all of the policy rules from the network element to a policy proxy network element. However, the overall policy rule that is enforced on any given packet does not change as the complete policy rule is partitioned into one rule set on the network element and another rule set on the policy proxy network element.

Once the network controller 130 detects the policy resource utilization threshold has been reached for a network element, the network controller 130 may install some or all of the policy rules for the selected EPG in the policy proxy network element. Once the policy rules are offloaded to the policy proxy network element, the overloaded network element may redirect traffic to the policy proxy network element. The packets in this traffic are encapsulated into overlay packets that are addressed to the policy proxy network element (e.g., the Virtual Tunnel Endpoint (VTEP) IP address), and may carry a tenant/Virtual Routing and Forwarding (VRF) identifier field (e.g., a Virtual Network Identifier (VNID)), as well as a source group tag and the tenant packet.

The policy proxy network element may apply offloaded policy rules using the tenant/VRF identifier, the source group tag identifying the source host of the packet, and a destination group tag identifying the destination host of the packet. The tenant/VRF identifier and source group tag are included in the overlay header of the redirected packet, but the policy proxy network derives the destination group from the tenant packet. To derive the destination group, the policy proxy network element stores a listing of endpoints to be able to derive the destination group.

Since the resources of each network element may not support storing the entire database of endpoints to be able to derive any destination group, the network controller 130 may shard the offloaded policy rules across multiple policy proxy network elements so that each policy proxy network element only stores a subset of the possible destination endpoint groups and rules. For instance, the network controller may split the entire range of possible destination endpoint groups into subset ranges of destination endpoint groups and assign a different subset range of destination endpoint groups to a different policy proxy network element.

In one example, a 16-bit group identifier leads to 64K possible EPG tags. The network controller 130 may separate the 64K possible tags into four shards, and assign each shard to a different policy proxy network element. For instance, a first policy proxy network element may be assigned a shard for the first 16K EPG tags. The first policy proxy network element would then program all of the policy rules for EPG tags with a value of 0-16K, and store a listing of all of the endpoints with EPG tags with a value of 0-16K. Similarly, a second policy proxy network element may be assigned a shard for the second 16K EPG tags, program the policy rules for EPG tags 16K-32K, and store a listing of endpoints with EPG tags 16K-32K. Additionally, a third policy proxy network element may be assigned a shard for the third 16K EPG tags, program the policy rules for EPG tags 32K-48K, and store a listing of endpoint with EPG tags 32K-48K. Further, a fourth policy proxy network element may be assigned a shard for the fourth 16K EPG tags, program the policy rules for EPG tags 48K-64K, and store a listing of endpoint with EPG tags 48K-64K.

Figure 2:
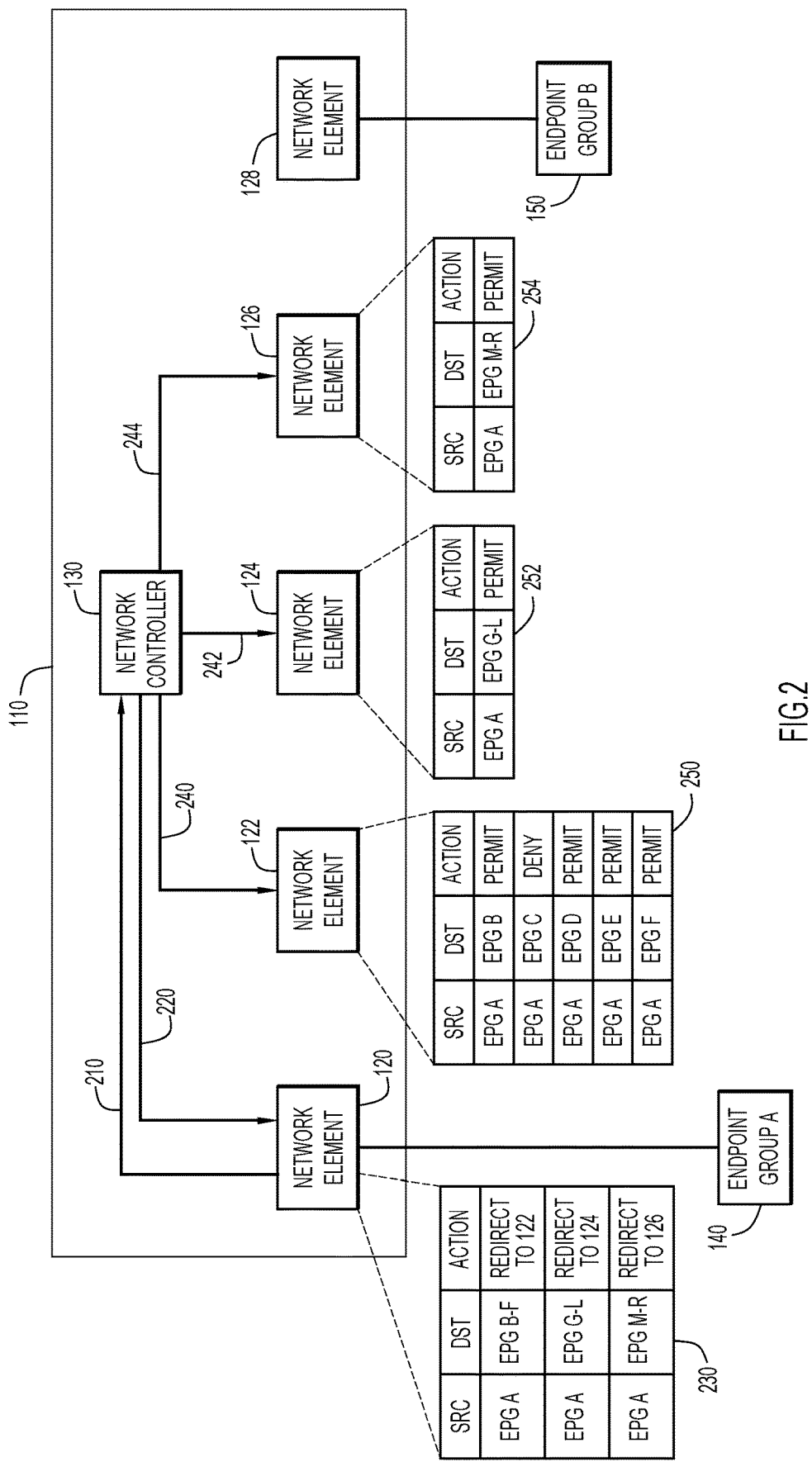
FIG. 2 is a simplified block diagram of messages exchanged in configuring network elements to act as policy proxies, according to an example embodiment.

Referring now to FIG. 2, a simplified block diagram illustrates one example of the network controller 130 offloading policy decisions to policy proxy network elements. If the policy resources of network element 120 become overloaded, then the network element sends a notification 210 to the network controller 130 with the overloaded status of the policy resources. In response to detecting that the policy resources of the network element 120 are overloaded, the network controller 130 selects the endpoint group 140 and shards the policy responsibility for endpoint group 140 (EPG A) across the network elements 122, 124, and 126 as policy proxies. In other examples, the network controller 130 may select some or all of the endpoint groups to offload the policy processing when the policy resources of the network element 120 are overloaded. The network controller 130 sends a message 220 that installs a sharding policy 230 redirecting any traffic with a source endpoint in the endpoint group 140 (EPG A) to one of the policy proxy network elements 122, 124, or 126 based on the destination of the traffic.

As shown in FIG. 2, any traffic from an endpoint in the endpoint group 140 (EPG A) with a destination in EPGs B-F is redirected to policy proxy network element 122. Similarly, any traffic from an endpoint in the endpoint group 140 (EPG A) with a destination in EPGs G-L or EPGs M-R is redirected to policy proxy network element 124 or policy proxy network element 126, respectively. In this simplified example with eighteen endpoint groups A-R, the three policy entries in the sharding policy 230 replace up to seventeen different policy entries, i.e., policy entries for traffic destined for each of the EPGs B-R from a source in EPG A.

The network controller 130 also sends messages 240, 242, and 244 to the policy proxy network elements 122, 124, and 126, respectively, to instruct the policy proxy network elements 122, 124, and 126 to install the policy entries for their respective shard of the policy entries for the traffic originating from endpoint group 140 (EPG A). Specifically, the message 240 instructs the policy proxy network element 122 to install the policy entries 250 in the policy resources of the network element 122. In the example of FIG. 2, the policy entries 250 deny traffic from endpoints in the EPG A with a destination of EPG C, but permit traffic with any other destination in the shard of EPGs B-F for which the policy proxy network element is responsible. Similarly, the message 242 instructs the policy proxy network element 124 to install the policy entries 252, and the message 244 instructs the policy proxy network element 126 to install the policy entries 254.

In one example, the policy resources of the network element 120 are overloaded when a policy TCAM exceeds a predetermined threshold of the capacity for policy entries. The notification 210 to the network controller 130 may be a periodic notification of the status of the policy TCAM. Additionally, the other network elements 122, 124, 126, and 128 may also notify the network controller 130 of the utilization of their respective policy TCAM utilization.

Figure 3:
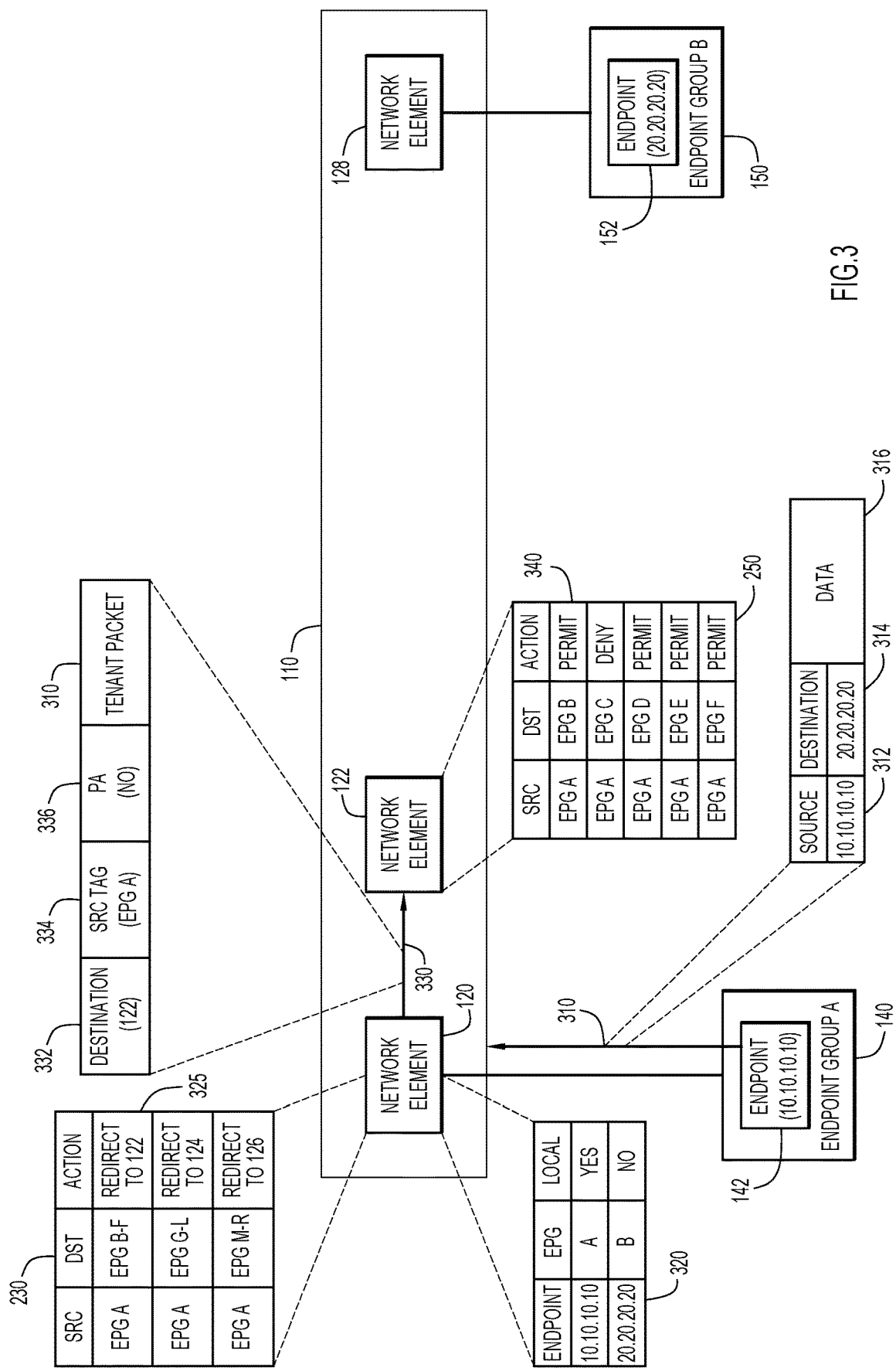
FIG. 3 is a simplified block diagram of a packet being redirected to a policy proxy, according to an example embodiment.

Referring now to FIG. 3, a simplified block diagram illustrates an example of redirecting a packet 310 to a policy proxy network element 122. An endpoint 142 in the endpoint group 140 sends a packet 310 to a destination endpoint 152, which is local to network element 128. The source endpoint 142 sends the packet 310 to the network element 120 that connects the endpoint 142 to the rest of the network 110, including network element 128. The packet 310 includes a source network address 312 (e.g., IP address 10.10.10.10), a destination address 314 (e.g., IP address 20.20.20.20), and data 316. The network element 120 determines the endpoint group of the source and the destination by cross referencing the source address and the destination address in an endpoint table 320.

The network element 120 stores an endpoint table 320 that includes an entry indicating that the endpoint 142 (e.g., IP address 10.10.10.10) belongs to endpoint group 140 (e.g., EPG A), and is local to the network element 120. The endpoint table also includes an entry that indicates the destination endpoint 152 (e.g., IP address 20.20.20.20) belongs to endpoint group 150 (e.g., EPG B), and is not locally attached to the network element 120.

Once the network element 120 determines the source endpoint group and the destination endpoint group, the network element determines that the packet 310 should be redirected to the policy proxy network element 122 based on an entry 325 in the sharding policy 230. The network element 120 generates an overlay packet 330 to encapsulate the packet 310 with overlay headers and send the packet 310 to the policy proxy network element 122. The overlay headers of the overlay packet 330 include a destination address 332 corresponding to the policy proxy network element 122. In one example, the destination address 332 may include a Virtual Tunnel Endpoint (VTEP) address corresponding to the policy proxy network element 122. The overlay headers of the overlay packet 330 also include a source tag 334 that indicates that the packet 310 originated from an endpoint belonging to the endpoint group 140 (e.g., EPG A). Additionally, the overlay headers of the overlay packet 330 include a policy indicator 336 that indicates that the network policy has not been applied to the packet 310. In one example, the policy indicator 336 may be a single bit that causes the recipient of the overlay packet 330 to apply the network policy and bounce the packet 310 to the intended destination.

When the policy proxy network element 122 receives the overlay packet 330, the policy proxy network element 122 detects the policy indicator 336, and applies the appropriate policy entry 340 from the policy entries 250. The policy proxy network element 122 may derive the destination endpoint group 150 from the tenant packet 310 to select the policy entry 340. The policy proxy network element 122 may use the source endpoint group indicated in the source tag 334.

The distributed policy proxy system 100 may use the capability of the network 110 to carry the source tag 334, but that capability is not necessary for the distributed policy proxy system 100 to function. Without the source tag 334 carried in the overlay packet 330 from the source network element 120, the policy proxy network element 122 derives both the source endpoint group 140 and the destination endpoint group 150 to determine the applicable policy entry 340. To facilitate deriving the source endpoint group 140, the policy proxy network element 122 stores additional listings in the listing of endpoints beyond the endpoints in the assigned shard of destination endpoints. Storing additional listing of endpoints may require additional hardware table space, but is implementable.

Figure 4:
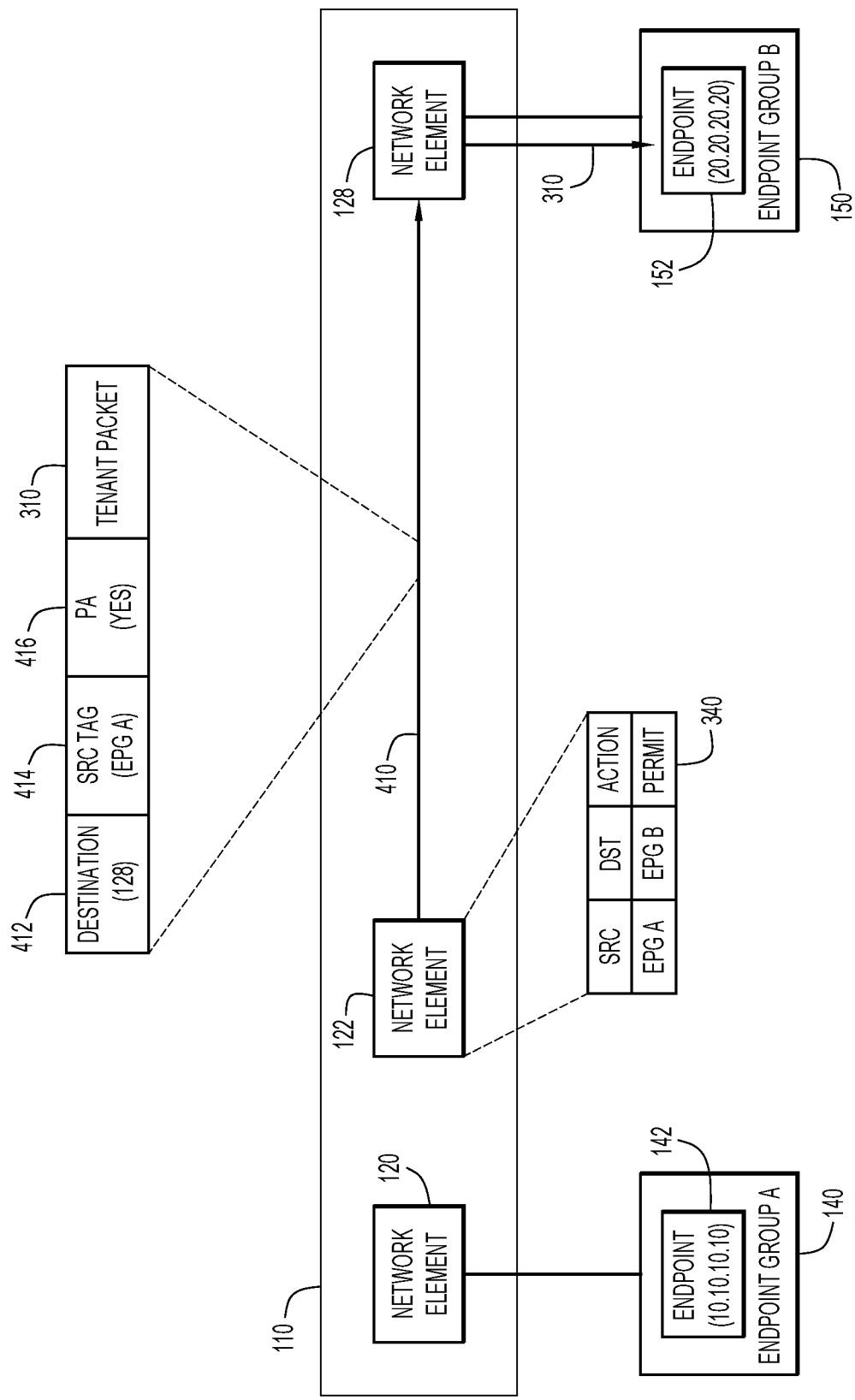
FIG. 4 is a simplified block diagram of a packet being directed to a destination after a policy proxy applies the appropriate policy to the packet, according to an example embodiment.

Referring now to FIG. 4, a simplified block diagram illustrates an example of forwarding the packet 310 to a destination endpoint 152 after a network policy is applied at a policy proxy network element 122. After the policy proxy network element 122 has verified with the policy entry 340 that the source endpoint group 140 (e.g., EPG A) is permitted to communicate with the destination endpoint group 150 (e.g., EPG B), the policy proxy network element 122 re-encapsulates the packet 310 into an overlay packet 410. The overlay headers of the overlay packet 410 include a destination address 412 corresponding to the destination network element 128. In one example, the destination address 412 may include a Virtual Tunnel Endpoint (VTEP) address corresponding to the destination network element 128. The overlay headers of the overlay packet 410 also include a source tag 414 that indicates that the packet 310 originated from an endpoint belonging to the endpoint group 140 (e.g., EPG A). Additionally, the overlay headers of the overlay packet 410 include a policy indicator 416 that indicates that the network policy has been applied to the packet 310.

When the destination network element 128 receives the overlay packet 410, the destination network element 128 detects the policy indicator 416, and determines that the network policy has been applied to the packet 310. The destination network element 128 forwards the unencapsulated packet 310 to the destination endpoint 152.

In one example, referring back to FIG. 3 and FIG. 4, the packet 310 transparently hops through the policy proxy network element 122 to the destination network element 128. The packet 310 ingresses the network 110 at the network element 120 and matches a policy entry 325 from the sharding policy 230 that redirects the packet 310 to the policy proxy network element 122. Based on the redirection action in the entry 325, the network element 120 encapsulates the packet 310 with an overlay header that includes the incoming VRF identifier in the destination address 332 and an indicator of the source EPG in the source tag 334. The policy proxy network element 122 parses the overlay packet 330 and stores the VRF identifier and source EPG from the overlay header.

The policy proxy network element 122 then decapsulates the packet 310 from the overlay header and looks up the destination address 314 of the packet 310 in the stored listing of endpoints to determine the destination endpoint group 150. With the source endpoint group 140 from the source tag 334 and the destination endpoint group 150 from the stored listing of endpoints, the policy proxy network element 122 to determine the appropriate policy entry 340 for the packet 310. The policy entry 340 permits the policy proxy network element 122 to send the packet 310 to the destination endpoint 152.

In addition to determining the destination endpoint group 150 of the destination endpoint 152, the listing of endpoints may also list the address (e.g., the VTEP identifier) of the destination network element 128. The policy proxy network element 122 encapsulates the packet 310 in an overlay packet 410 to send it to the destination network element 128 over the network 110. Since the endpoint group 150 is not local to the policy proxy network element 122, all of the endpoints in the endpoint group 150 carry an indication to bounce traffic for the destination endpoint group 150. This indication may also cause the policy proxy network element 122 to retain the source address (e.g., the VTEP identifier of the source network element 120) from the received overlay packet 330, and reuse the source address in the overlay packet 410. By retaining the source address of the overlay packet 330 in the overlay packet 410, the overly packet 410 that arrives at the destination network element 128 appears to have been sent from the source network element 120 without an indication that the overlay packet 410 took a hop through the policy proxy network element 122.

Figure 5:
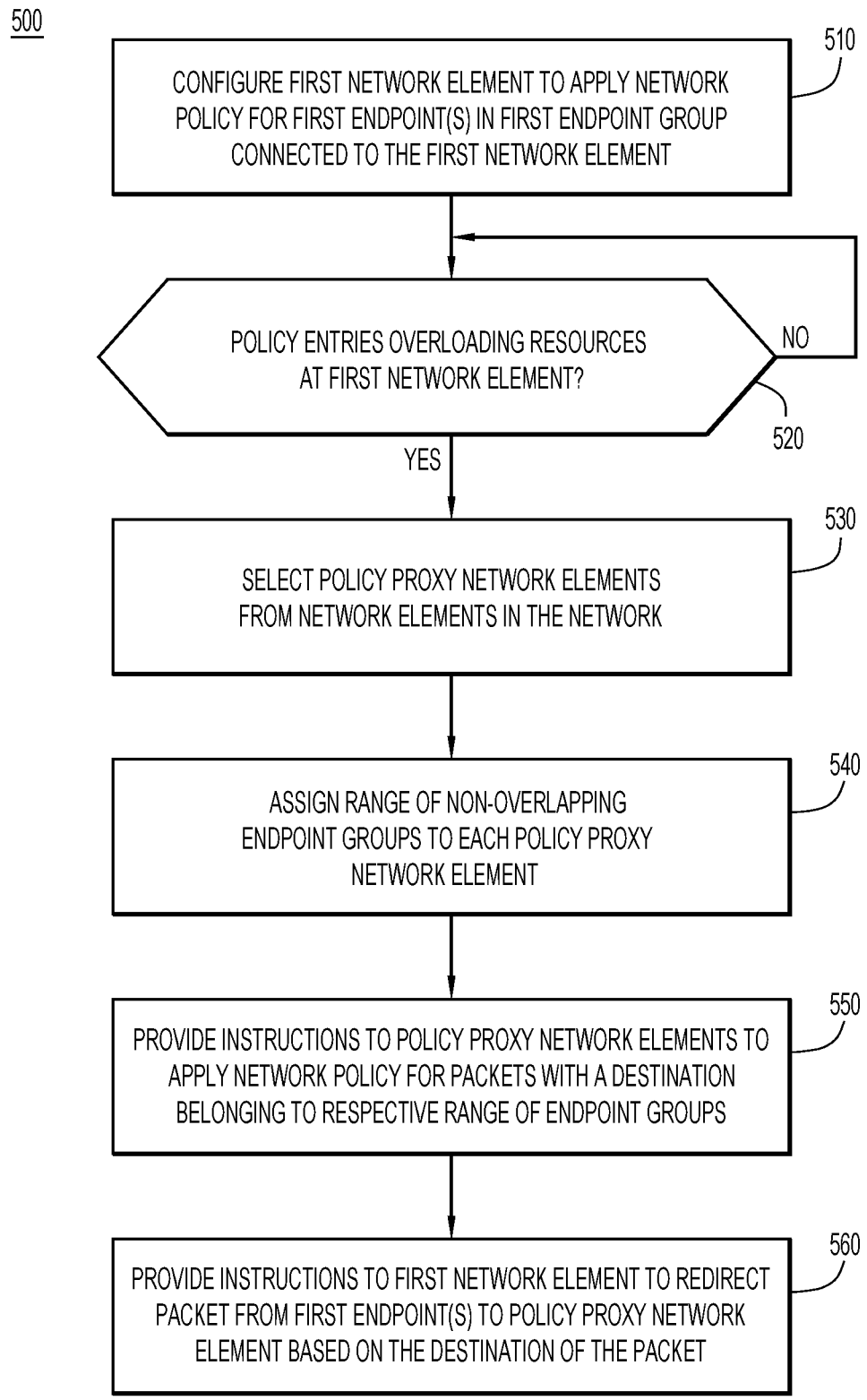
FIG. 5 is a flowchart illustrating operations of a network controller in configuring network elements to act as a distributed policy proxy, according to an example embodiment.

Referring now to FIG. 5, a flowchart illustrates operations performed at a network controller (e.g., network controller 130) in a process 500 for distributing policy processing across multiple network elements in response to overloaded policy resources at one network element. At 510, the network controller configures a first network element among a plurality of network elements to apply a network policy for one or more first endpoints connected to the first network element. The one or more first endpoints belong to a first endpoint group that is used to determine policy decisions for network traffic involving the one or more first endpoints.

At 520, the network controller detects whether the policy resources at the first network element are being overloaded by policy entries. In one example, the policy resources of all of the plurality of network elements are monitored to determine the utilization of policy resources at each network element. In another example, the policy resources comprise a policy TCAM with policy entries associating actions (e.g., permit, deny, redirect, label QoS) with network traffic between two endpoint groups.

At 530, the network controller selects a plurality of policy proxy network elements from the plurality of network elements. In one example, the selection of policy proxy network elements is based on the relative utilization of the policy resources in each network element. For instance, network elements that have a relatively low utilization of policy resources are more likely to be selected to act as a policy proxy network element. At 540, the network element assigns a range of endpoint groups to each policy proxy network element. The ranges of endpoint groups assigned to each policy proxy network element are exclusive to their respective policy proxy network element, such that the range of a first policy proxy network element does not overlap with the range of a second policy proxy network element.

At 550, the network controller provides instructions to the policy proxy network elements to apply the network policy for packets with a destination endpoint belonging to their respective range of endpoint groups. In one example, the network controller provides policy entries corresponding to the assigned range of endpoint groups for each policy proxy network element. In another example, the network controller may directly provide each policy proxy network element with a listing of endpoints that belong to the respective assigned range of endpoint groups or instruct the policy proxy element to get the endpoints list from another network element.

At 560, the network controller provides instructions to the first network element to redirect packets from the one or more first endpoints to one of the policy proxy network elements based on the destination of the packet. In one example, the network controller may instruct the replace policy entries in the overloaded policy resources with sharding policy entries that redirect different shards of network traffic to different policy proxy network elements based on the destination of the network traffic.

In one example, the network controller may determine how many EPG shards (i.e., policy proxy network elements) to generate, as well as the number of endpoints in each EPG shard, to handle hotspots of policy resources (e.g., TCAM utilization). Additionally, the network controller may relocate a shard from one policy proxy network element to a different policy proxy network element or back to the originally overloaded network element based on a growing or shrinking load on the policy resources. In this way, the techniques presented herein provide a dynamic schema to manage the sharding and a fully automated distributed policy proxy implementation.

Referring now to FIG. 6, a hardware block diagram illustrates a computing device 600 that may perform the functions of any of the servers or computing or control entities (e.g., network controller 130) referred to herein in connection with the port extender flow control system described herein. It should be appreciated that FIG. 6 provides only an illustration of one embodiment and does not imply any limitations with regard to the environments in which different embodiments may be implemented. Many modifications to the depicted environment may be made.

As depicted, the device 600 includes a bus 612, which provides communications between computer processor(s) 614, memory 616, persistent storage 618, communications unit 620, and input/output (I/O) interface(s) 622. Bus 612 can be implemented with any architecture designed for passing data and/or control information between processors (such as microprocessors, communications and network processors, etc.), system memory, peripheral devices, and any other hardware components within a system. For example, bus 612 can be implemented with one or more buses.

Memory 616 and persistent storage 618 are computer readable storage media. In the depicted embodiment, memory 616 includes random access memory (RAM) 624 and cache memory 626. In general, memory 616 can include any suitable volatile or non-volatile computer readable storage media. Instructions for the distributed policy control logic 190 may be stored in memory 616 or persistent storage 618 for execution by processor(s) 614.

One or more programs may be stored in persistent storage 618 for execution by one or more of the respective computer processors 614 via one or more memories of memory 616. The persistent storage 618 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 618 may also be removable. For example, a removable hard drive may be used for persistent storage 618. Other examples include optical and magnetic disks, thumb drives, and smart cards that are inserted into a drive for transfer onto another computer readable storage medium that is also part of persistent storage 618.

Communications unit 620, in these examples, provides for communications with other data processing systems or devices (e.g., network elements 120, 122, 124, 126, and 128). In these examples, communications unit 620 includes one or more network interface units, such as network interface cards. Communications unit 620 may provide communications through the use of either or both physical and wireless communications links.

I/O interface(s) 622 allows for input and output of data with other devices that may be connected to computer device 600. For example, I/O interface 622 may provide a connection to external devices 628 such as a keyboard, keypad, a touch screen, and/or some other suitable input device. External devices 628 can also include portable computer readable storage media such as database systems, thumb drives, portable optical or magnetic disks, and memory cards.

Software and data used to practice embodiments can be stored on such portable computer readable storage media and can be loaded onto persistent storage 618 via I/O interface(s) 622. I/O interface(s) 622 may also connect to a display 630. Display 630 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, network devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the test module, the network device, the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to user identities or credentials). The database system may be included within or coupled to the server and/or client systems. The database systems and/or storage structures may be remote from or local to the computer or other processing systems, and may store any desired data (e.g., data relating to user authentication/authorization or credentials).

The present embodiments may employ any number of any type of user interface (e.g., Graphical User Interface (GUI), command-line, prompt, etc.) for obtaining or providing information (e.g., data relating to user authentication/authorization or credentials), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In summary, the techniques presented herein provide a distributed network policy system that scales with increasing endpoint numbers and policy granularity. The distributed network policy system works with existing network hardware, without additional expense for upgrading the network fabric and/or purchasing additional external firewalls. The system leverages network micro-segmentation into endpoint groups to distribute network policy application from overloaded network elements to underutilized network elements.

In addition to policy enforcement, the techniques presented herein provide a means of scalable service chaining. The service chain policies may be located to the policy proxy network elements, which may facilitate implementing some features (e.g., Network Address Translation). Additionally, the distributed policy proxy system avoids any bandwidth restrictions that may arise from offloading policy rules to a centralized firewall. Since the network is already laid to handle bandwidth to each network element, tasking underused network elements as policy proxy elements does not encounter the same bandwidth bottlenecks.

According to the techniques described herein, any network element may act as a policy proxy network element based on its usage. The network controller can dynamically determine which network element may be overloaded sufficiently to offload some or all of the policy responsibility. Additionally, the policy responsibility for an endpoint group may be offloaded to multiple policy proxy elements to increase bandwidth as well as redundancy. The policy proxy network elements may use a bounce mechanism to enable the policy application to be transparent to the destination network element. Further, incorporating the distributed policy proxy system as described herein does not require any additional hardware resource to be added to a network. The distributed policy proxy system enables consistent policy application with or without the policy proxy functionality, enabling a seamless transition when using or stopping the policy proxy functionality.

In one form, a method is provided to offload network policy processing from an overloaded first network element to a plurality of policy proxy network elements. The method includes configuring a first network element among a plurality of network elements to apply a network policy for traffic associated with a first endpoint group. The first network element is connected to one or more first endpoints in the first endpoint group. The method also includes detecting that policy entries associated with the first endpoint group are overloading policy resources at the first network element. The method further includes selecting a plurality of policy proxy network elements among the plurality of network elements and assigning a range of endpoint groups to each policy proxy network element. Each policy proxy network element is assigned to handle policy processing for traffic with destination endpoints belonging to its assigned range of endpoint groups. The range of endpoint groups assigned to each particular policy proxy network element is exclusive to that particular policy proxy network element. The method also includes providing instructions to the plurality of policy proxy network elements to enable each policy proxy network element to apply the network policy for an assigned range of endpoint groups. The method further includes providing instructions to the first network element to redirect a packet from the one or more first endpoints in the first endpoint group to a first policy proxy network element among the plurality of policy proxy network elements based on a destination of the packet.

In another form, apparatus comprising a network interface and a processor is provided. The network interface is configured to communicate with a plurality of network elements. The processor is configured to configure a first network element among the plurality of network elements to apply a network policy for traffic associated with a first endpoint group. The first network element is connected to one or more first endpoints in the first endpoint group. The processor is also configured to detect that policy entries associated with a first endpoint group are overloading policy resources at the first network element, and select a plurality of policy proxy network elements among the plurality of network elements. The processor is further configured to assign a range of endpoint groups to each policy proxy network element among the plurality of policy proxy network elements. Each policy proxy network element is assigned to handle policy processing for traffic with destination endpoints belonging to its assigned range of endpoint groups. The range of endpoint groups assigned to each particular policy proxy network element is exclusive to the particular policy proxy network element. The processor is also configured to cause the network interface to provide instructions to the plurality of policy proxy network elements to enable each policy proxy network element to apply the network policy for an assigned range of endpoint groups. The processor is further configured to cause the network interface to provide instructions to the first network element to redirect a packet from the one or more first endpoints in the first endpoint group to a first policy proxy network element among the plurality of policy proxy network elements based on a destination of the packet.

In still another form, a system comprising a plurality of network elements and a network controller is provided. The plurality of network elements includes a first network element connected to one or more first endpoints in a first endpoint group. The network controller is configured to configure the first network element to apply a network policy for traffic associated with the first endpoint group. The network controller is also configured to detect that policy entries associated with the first endpoint group are overloading policy resources at the first network element, and select a plurality of policy proxy network elements among the plurality of network elements. The network controller is further configured to assign a range of endpoint groups to each policy proxy network element. Each policy proxy network element is assigned to handle policy processing for traffic with destination endpoints belonging to its assigned range of endpoint groups. The range of endpoint groups assigned to each particular policy proxy network element is exclusive to the particular policy proxy network element. The network controller is also configured to provide instructions to the plurality of policy proxy network elements to enable each policy proxy network element to apply the network policy for an assigned range of endpoint groups. The network controller is further configured to provide instructions to the first network element to redirect a packet from the one or more first endpoints in the first endpoint group to a first policy proxy network element among the plurality of policy proxy network elements based on the destination of the packet.

In yet another form, a non-transitory computer readable storage media is provided that is encoded with instructions that, when executed by a processor of a network controller, cause the processor to configure a first network element among a plurality of network elements to apply a network policy for traffic associated with a first endpoint group. The first network element is connected to one or more first endpoints in the first endpoint group. The instructions also cause the processor to detect that policy entries associated with the first endpoint group are overloading policy resources at the first network element. The instructions further cause the processor to select a plurality of policy proxy network elements among the plurality of network elements and assign a range of endpoint groups to each policy proxy network element. Each policy proxy network element is assigned to handle policy processing for traffic with destination endpoints belonging to its assigned range of endpoint groups. The range of endpoint groups assigned to each particular policy proxy network element is exclusive to that particular policy proxy network element. The instructions also cause the processor to provide instructions to the plurality of policy proxy network elements to enable each policy proxy network element to apply the network policy for an assigned range of endpoint groups. The instructions further cause the processor to provide instructions to the first network element to redirect a packet from the one or more first endpoints in the first endpoint group to a first policy proxy network element among the plurality of policy proxy network elements based on a destination of the packet.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language, Python or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the presented embodiments.

Aspects of the present embodiments are described herein with reference to flowchart illustrations and/or block diagrams of methods, apparatus (systems), and computer program products according to presented embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various presented embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   configuring a first network element among a plurality of network elements to apply a network policy for traffic associated with a first endpoint group, the first network element connected to one or more first endpoints in the first endpoint group;
   detecting whether policy entries associated with the first endpoint group are overloading policy resources at the first network element;
   responsive to a determination that the policy entries associated with the first endpoint group are overloading policy resources at the first network element, selecting a plurality of policy proxy network elements among the plurality of network elements;
   assigning a range of endpoint groups to each policy proxy network element among the selected plurality of policy proxy network elements, each policy proxy network element assigned to handle policy processing for traffic with destination endpoints belonging to a corresponding assigned range of endpoint groups, wherein the range of endpoint groups assigned to each particular policy proxy network element is exclusive to the particular policy proxy network element;
   providing instructions to the selected plurality of policy proxy network elements to enable each policy proxy network element to apply the network policy for the corresponding assigned range of endpoint groups; and
   providing instructions to the first network element to redirect a packet from the one or more first endpoints in the first endpoint group to a first policy proxy network element among the selected plurality of policy proxy network elements based on a destination of the packet.

2. The method of claim 1, wherein detecting whether policy entries associated with the first endpoint group are overloading policy resources at the first network element comprises detecting whether a Ternary Content Addressable Memory (TCAM) storing the policy entries is within a predetermined threshold of a maximum number of policy entries.

3. The method of claim 1, further comprising providing an instruction to the first network element to identify the first endpoint group in an overlay header redirecting the packet to the first policy proxy network element.

4. The method of claim 3, wherein the overlay header includes a policy indicator indicating whether the first policy proxy network element has applied the network policy to the packet.

5. The method of claim 1, further comprising adjusting a number of the policy proxy network elements in the selected plurality of policy proxy network elements based on an availability of the policy resources at each of the plurality of network elements.

6. The method of claim 1, further comprising reassigning a first range of endpoint groups from one policy proxy network element to another policy proxy network element based on an availability of policy resources across the selected plurality of policy proxy network elements.

7. An apparatus comprising:
a network interface configured to communicate with a plurality of network elements; and
a processor configured to:
configure a first network element among the plurality of network elements to apply a network policy for traffic associated with a first endpoint group, the first network element connected to one or more first endpoints in the first endpoint group;
detect whether policy entries associated with the first endpoint group are overloading policy resources at the first network element;
responsive to a determination that the policy entries associated with the first endpoint group are overloading policy resources at the first network element, select a plurality of policy proxy network elements among the plurality of network elements;
assign a range of endpoint groups to each policy proxy network element among the selected plurality of policy proxy network elements, each policy proxy network element assigned to handle policy processing for traffic with destination endpoints belonging to a corresponding assigned range of endpoint groups, wherein the range of endpoint groups assigned to each particular policy proxy network element is exclusive to the particular policy proxy network element;
cause the network interface to provide instructions to the selected plurality of policy proxy network elements to enable each policy proxy network element to apply the network policy for the corresponding assigned range of endpoint groups; and
cause the network interface to provide instructions to the first network element to redirect a packet from the one or more first endpoints in the first endpoint group to a first policy proxy network element among the selected plurality of policy proxy network elements based on a destination of the packet.

8. The apparatus of claim 7, wherein the processor is configured to detect whether policy entries associated with the first endpoint group are overloading policy resources at the first network element by detecting whether a Ternary Content Addressable Memory (TCAM) storing the policy entries is within a predetermined threshold of a maximum number of policy entries.

9. The apparatus of claim 7, wherein the processor is further configured to cause the network interface to provide an instruction to the first network element to identify the first endpoint group in an overlay header redirecting the packet to the first policy proxy network element.

10. The apparatus of claim 9, wherein the overlay header includes a policy indicator indicating whether the first policy proxy network element has applied the network policy to the packet.

11. The apparatus of claim 7, wherein the processor is further configured to adjust a number of the policy proxy network elements in the selected plurality of policy proxy network elements based on an availability of the policy resources at each of the plurality of network elements.

12. The apparatus of claim 7, wherein the processor is further configured to reassign a first range of endpoint groups from one policy proxy network element to another policy proxy network element based on an availability of policy resources across the selected plurality of policy proxy network elements.

13. A system comprising:
a plurality of network elements including a first network element connected to one or more first endpoints in a first endpoint group; and
a network controller coupled to the plurality of network elements, the network controller configured to:
configure the first network element to apply a network policy for traffic associated with the first endpoint group;
detect whether policy entries associated with the first endpoint group are overloading policy resources at the first network element;
responsive to a determination that the policy entries associated with the first endpoint group are overloading policy resources at the first network element, select a plurality of policy proxy network elements among the plurality of network elements;
assign a range of endpoint groups to each policy proxy network element among the selected plurality of policy proxy network elements, each policy proxy network element assigned to handle policy processing for traffic with destination endpoints belonging to a corresponding assigned range of endpoint groups, wherein the range of endpoint groups assigned to each particular policy proxy network element is exclusive to the particular policy proxy network element;
provide instructions to the selected plurality of policy proxy network elements to enable each policy proxy network element to apply the network policy for the corresponding assigned range of endpoint groups; and
provide instructions to the first network element to redirect a packet from the one or more first endpoints in the first endpoint group to a first policy proxy network element among the selected plurality of policy proxy network elements based on a destination of the packet.

14. The system of claim 13, wherein the network controller is configured to detect whether policy entries associated with the first endpoint group are overloading policy resources at the first network element by detecting whether a Ternary Content Addressable Memory (TCAM) storing the policy entries is within a predetermined threshold of a maximum number of policy entries.

15. The system of claim 13, wherein the first network element is configured to identify the first endpoint group in an overlay header redirecting the packet to the first policy proxy network element.

16. The system of claim 15, wherein the overlay header includes a policy indicator indicating whether the first policy proxy network element has applied the network policy to the packet.

17. The system of claim 13, wherein the network controller is further configured to adjust a number of the policy proxy network elements in the selected plurality of policy proxy network elements based on an availability of the policy resources at each of the plurality of network elements.

18. The system of claim 13, wherein the network controller is further configured to reassign a first range of endpoint groups from one policy proxy network element to another policy proxy network element based on an availability of policy resources across the selected plurality of policy proxy network elements.

19. The system of claim 13, wherein the first policy proxy network element is configured to derive a destination endpoint group from the packet, the destination endpoint group determining an applicable policy entry of the network policy.

20. The system of claim 19, wherein the first policy proxy network element is configured to derive the first endpoint group from the packet, the applicable policy entry being based on a combination of the first endpoint group and the destination endpoint group.

\* \* \* \* \*